(12) United States Patent
Cauley et al.

(10) Patent No.: US 11,845,904 B1
(45) Date of Patent: Dec. 19, 2023

(54) THERMITE FIRE STARTER KITS

(71) Applicant: Advanced Defense Components Inc., Walhalla, SC (US)

(72) Inventors: Sean Patrick Cauley, Walhalla, SC (US); Scott Robert Higgins, Honolulu, HI (US); Jeremy Keith Moore, Walhalla, SC (US); Brian Patrick Cole, Ashburn, VA (US)

(73) Assignee: Advanced Defense Components Inc., Walhalla, SC (US)

( * ) Notice: Subject to any disclaimer, the term of this patent is extended or adjusted under 35 U.S.C. 154(b) by 0 days.

(21) Appl. No.: 17/873,007

(22) Filed: Jul. 25, 2022

Related U.S. Application Data

(60) Provisional application No. 63/224,949, filed on Jul. 23, 2021, provisional application No. 63/224,955, filed on Jul. 23, 2021.

(51) Int. Cl.
  *C10L 11/04* (2006.01)
  *F23Q 2/18* (2006.01)
  (Continued)

(52) U.S. Cl.
  CPC .............. *C10L 11/04* (2013.01); *B32B 15/01* (2013.01); *C10L 11/06* (2013.01); *F23Q 1/02* (2013.01);
  (Continued)

(58) Field of Classification Search
  CPC ...... C10L 11/04; C10L 11/06; C10L 2230/06; B32B 15/01; B32B 2307/30; F23Q 1/02; F23Q 2/18
  See application file for complete search history.

(56) References Cited

U.S. PATENT DOCUMENTS 2,634,199 A * 4/1953 Lorenzi ................... A24D 1/08
  149/40
3,515,525 A * 6/1970 Fearon ..................... C06F 3/02
  44/541
(Continued)

FOREIGN PATENT DOCUMENTS

JP  4580551 B2 * 11/2010 ............. B23K 23/00
PL  257748 A1 * 11/1987

*Primary Examiner* — Vishal V Vasisth
(74) *Attorney, Agent, or Firm* — BEHMKE INNOVATION GROUP LLC; James M. Behmke; Keith O. Mitchell

(57) ABSTRACT

In one embodiment, a portable thermite fire starter kit is provided. For instance, one or more small pieces or solid blocks of thermite may be contained within a portable kit container along with one or more ignition items. The ignition items may comprise thermite matches. In one embodiment, the ignition items are kept separate from the pieces of thermite. In one embodiment, one or both of the thermite pieces and/or thermite matches are constructed as multiple layers of progressively ignitable materials and/or compounds. In particular, the layers may start at a first layer and that can reach a first burn temperature that is at least a subsequent adjacent layer ignition temperature, where each subsequent intermediate layer leading to the thermite progressively increases in ignition temperature to not more than a previously adjacent layer burn temperature and also increases in burn temperature to at least a subsequent adjacent layer ignition temperature.

16 Claims, 12 Drawing Sheets

(51) Int. Cl.
　　　*F23Q 1/02*　　　(2006.01)
　　　*B32B 15/01*　　　(2006.01)
　　　*C10L 11/06*　　　(2006.01)

(52) U.S. Cl.
　　　CPC ............ *F23Q 2/18* (2013.01); *B32B 2307/30* (2013.01); *C10L 2230/06* (2013.01)

(56) References Cited

U.S. PATENT DOCUMENTS

| | | | | |
|---|---|---|---|---|
| 3,961,576 | A * | 6/1976 | Montgomery, Jr. | F42B 12/44 102/491 |
| 4,464,989 | A * | 8/1984 | Gibson | F42B 3/128 102/202 |
| 4,832,703 | A * | 5/1989 | Campana | C10L 11/04 44/519 |
| 5,997,667 | A * | 12/1999 | Jacobson | F42B 12/44 102/289 |
| 2006/0060272 | A1 * | 3/2006 | Naud | C06B 33/00 149/37 |

* cited by examiner

| Stage 1 (outer tip) | | mass (gms) |
|---|---|---|
| KClO3 | 39.00% | 11.7 |
| Sulfur | 39.00% | 11.7 |
| glass: ground | 2.00% | 0.6 |
| PVA (10%)/H2O | 20.00% | 6 |
| Total tip | 100.00% | 30 |

Table 1

FIG. 7A

| Stage 2 (inner tip) | | mass (gms) |
|---|---|---|
| Mg | 23.00% | 3 |
| KCLO3 | 38.66% | 5.0421724 |
| Lacquer | 38.34% | 5 |
| Total Intermediate | 100.00% | 13.042172 |

Table 2

FIG. 7B

| Stage 3 (Bulk Gross Percentage) | | mass (gms) |
|---|---|---|
| Copper thermite (4.42 to 1 mass ratio) | 14.00% | 14 |
| Iron thermite (2.96 to 1 mass ratio) | 60.00% | 60 |
| Mg | 8.00% | 8 |
| Lacquer | 12.00% | 12 |
| Sand | 6.00% | 6 |
| Total bulk | 100.00% | 100 |

Table 3A

FIG. 7C

| Stage 3 (Bulk Individual componets) | Mass (gm) |
|---|---|
| CuO | 11.42 |
| Al | 2.58 |
| Fe2O3 | 44.69 |
| Al | 15.31 |
| Mg | 8.00 |
| Lacquer | 12.00 |
| Sand | 6.00 |
| Total bulk | 100.00 |

Table 3B

FIG. 7D

THERMITE FIRE STARTER KITS

RELATED APPLICATIONS

This application claims priority to the following U.S. Provisional Applications, the contents of each of which being incorporated herein by reference:

U.S. Prov. Appl. Ser. No. 63/224,955, filed on Jul. 23, 2021, entitled PORTABLE PIECED THERMITE FIRE STARTER KIT, by Moore, et al.

U.S. Prov. Appl. Ser. No. 63/224,949, filed on Jul. 23, 2021, entitled PORTABLE THERMITE BLOCK FIRE STARTER KIT, by Moore, et al.

TECHNICAL FIELD

The present disclosure relates generally to thermite-based tools and associated uses and accessories, and, more particularly, to a portable pieced thermite fire starter kit and a portable thermite block fire starter kit.

BACKGROUND

Thermite is a non-explosive formulation consisting of metals and metal oxides that cause high-temperature exothermic reaction, often used for welding, cutting, melting, surfacing, casting, destroying, and so on. Many variants of thermite formulations have been developed for specific uses over time, each with specific qualities (e.g., temperatures, ignitability, safety, rigidity, longevity, combustion sustainability, etc.). Thermite compositions consist generally of a mixture of a finely divided, strongly reducible metal oxide (e.g., iron/ferrous oxide or others, such as copper/cupric oxide, nickel oxide, etc.), and a finely divided strong reducing agent (e.g., aluminum, silicon, magnesium, etc.). Other materials, including other metals, binders (e.g., polyvinyl alcohol), and so on, may also be added, depending on the particular desired use and outcome.

Once ignited, the thermite compositions react highly exothermically, thereby raising the temperature of the products to around 3000° C. The heat from the reaction is used for various purposes, such as destruction of military targets and munitions, incendiary weapons, cutting and welding torches, igniters for other reactions such as activation of air bags, plating of metals upon substrates, cutting or plugging oil well conduits, and the like.

One typical example configuration of a handheld portable thermite tool comprises an elongated pressed rod made from a thermite composition, often called a thermite pen, thermite pencil, thermite torch, thermite lance, and so on, typically having a cross-section that is close to rectangular, with rounded corners, or generally circular. Such handheld tools may be used for emergency and rescue work, construction assembly and dismantling, repair of structures and machinery, law enforcement or military applications, and so on, particularly in any location regardless of the presence of any available power sources. That is, such thermite rods produce flame temperatures high enough to melt (e.g., cut) products made of steel, non-ferrous metals, glass, composite materials, and other hard materials, while still being compact and portable, and having strength characteristics sufficient for its transportation and use.

Another example configuration of a handheld portable thermite tool comprises thermite fire starters. In particular, the intense heat produced by a thermite reaction can be used to ignite other materials and/or fuels, such as damp wood, charcoal, and so on. However, the portability, safety, and usefulness of such thermite fire starters are currently limited, and their widespread applicability has been constrained, accordingly.

SUMMARY

According to one or more embodiments of the disclosure, devices, systems, and techniques introduced herein relate to thermite-based tools and associated uses and accessories. In particular, as described herein, the present disclosure is directed to thermite fire starters.

Specifically, according to the present disclosure, embodiments herein provide for a portable pieced thermite fire starter kit. For instance, in one embodiment, one or more small pieces (e.g., formed cubed, short rods or rod segments, etc.) of thermite may be contained within a portable kit container (e.g., fireproof) along with one or more ignition items. In one embodiment, the ignition items comprise thermite matches. In one embodiment, the ignition items are kept separate from the pieces of thermite. In one embodiment, one or both of the thermite pieces and/or thermite matches are constructed as multiple layers of progressively ignitable materials and/or compounds. In particular, the layers may start at a first layer (that is most easily ignited) and that can reach a first burn temperature that is at least a subsequent adjacent layer ignition temperature, where each subsequent intermediate layer leading to the thermite progressively increases in ignition temperature to not more than a previously adjacent layer burn temperature and also increases in burn temperature to at least a subsequent adjacent layer ignition temperature. For instance, the thermite match may comprise a multi-staged formulation comprising at least an outer ignition tip and a thermite fuel stage. The outer ignition tip may comprise an ignition compound that can be struck/scraped against an abrasive counterchemical surface (e.g., red phosphorous) to initiate the reaction, which in one embodiment is located on the outside of the portable kit container. The high burn temperature of the thermite match may then be used to ignite the thermite pieces. Alternatively, where the thermite pieces have multiple progressively ignitable layers, the kit may contain conventional matches suitable for igniting the first of such layers. The ignited thermite pieces may then be used to further ignite other hard-to-ignite materials, such as wet wood, larger fuel wood, and so on.

Additional embodiments herein provide for a portable thermite block fire starter kit. For instance, a block of thermite may be contained within a portable kit container (e.g., fireproof) along with one or more ignition items. In one embodiment, the block of thermite is the shape of size (in area) of the kit container, and in one embodiment may be formed directly into the kit container (e.g., a puck-shaped container). In one embodiment, the ignition items comprise thermite matches. In one embodiment, the ignition items are kept separate from the block of thermite. In one embodiment, one or both of the thermite block and/or thermite matches are constructed as multiple layers of progressively ignitable materials and/or compounds. In particular, the layers may start at a first layer (that is most easily ignited) and that can reach a first burn temperature that is at least a subsequent adjacent layer ignition temperature, where each subsequent intermediate layer leading to the thermite progressively increases in ignition temperature to not more than a previously adjacent layer burn temperature and also increases in burn temperature to at least a subsequent adjacent layer ignition temperature. For instance, the thermite match may comprise a multi-staged formulation comprising at least an outer ignition tip and a thermite fuel stage. The outer ignition tip may comprise an ignition compound that can be struck/scraped against an abrasive counter-chemical surface (e.g., red phosphorous) to initiate the reaction, which in one embodiment is located on the outside of the portable kit container. The high burn temperature of the thermite match may then be used to ignite the thermite block. Alternatively, where the thermite block has multiple progressively ignitable layers, the kit may contain conventional matches suitable for igniting the first of such layers. The ignited thermite block may then be used to further ignite other hard-to-ignite materials, such as wet wood, larger fuel wood, and so on.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7D illustrate example tables showing illustrative formulas of a three-layer progression of staged ignition of a portable thermite fire starter kit.

DESCRIPTION OF EXAMPLE EMBODIMENTS

As noted above, one example configuration of a handheld portable thermite tool comprises thermite fire starters. In particular, the intense heat produced by a thermite reaction can be used to ignite other materials and/or fuels, such as damp wood, charcoal, and so on. However, as also noted, the portability, safety, and usefulness of such thermite fire starters are currently limited, and their widespread applicability has been constrained, accordingly.

According to one or more embodiments of the disclosure, therefore, one or more embodiments of improved thermite fire starters are provided.

Figure 1:
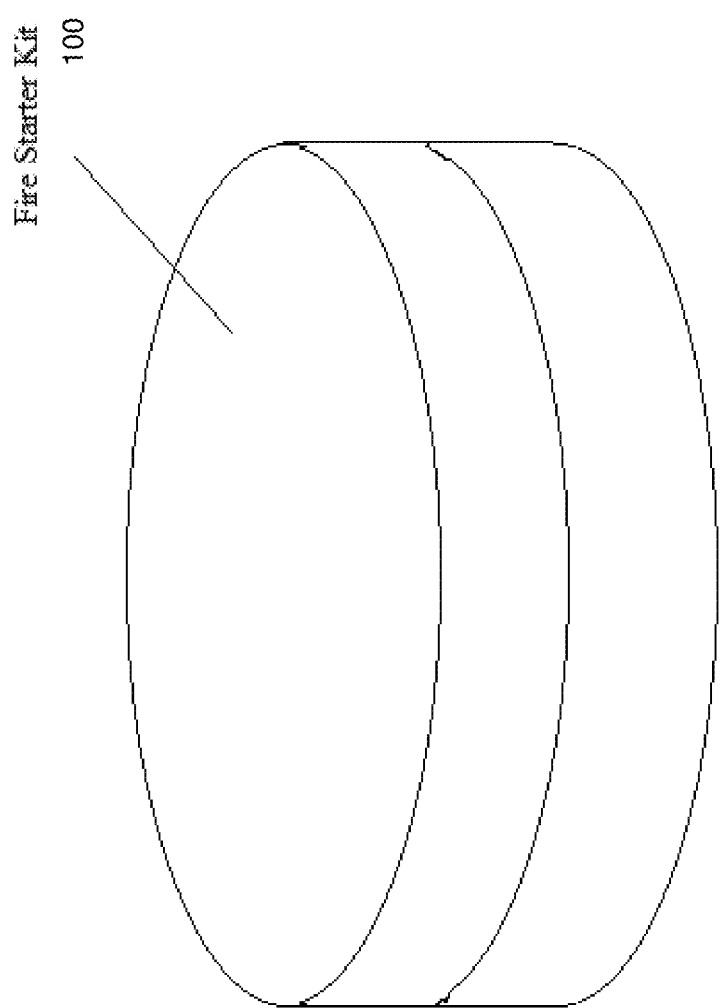
FIG. 1 illustrates an example thermite fire starter kit in accordance with one or more embodiments of the present disclosure.
Figure 2A:
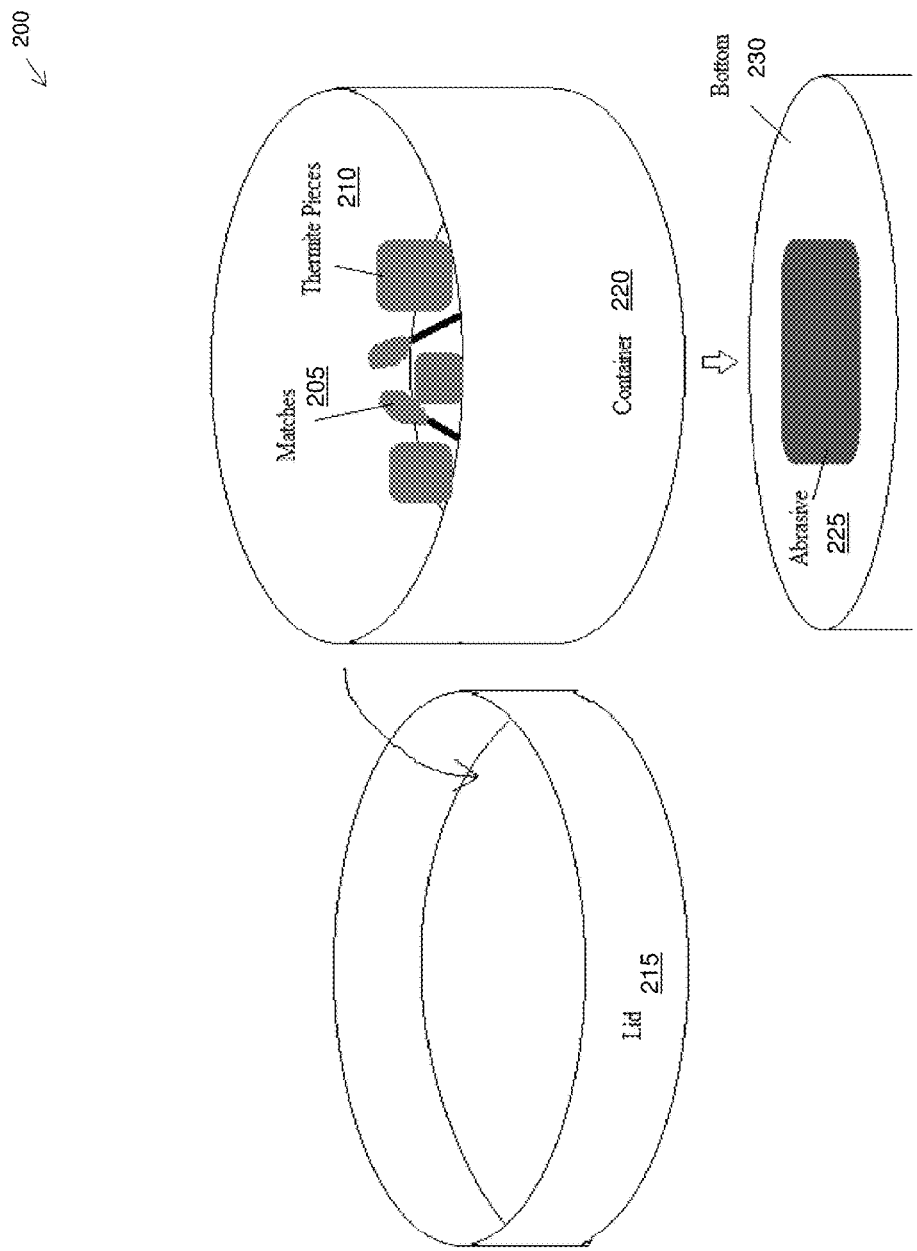
FIGS. 2A-2B illustrate examples of a portable pieced thermite fire starter kit in accordance with one or more embodiments of the present disclosure.
Figure 2B:
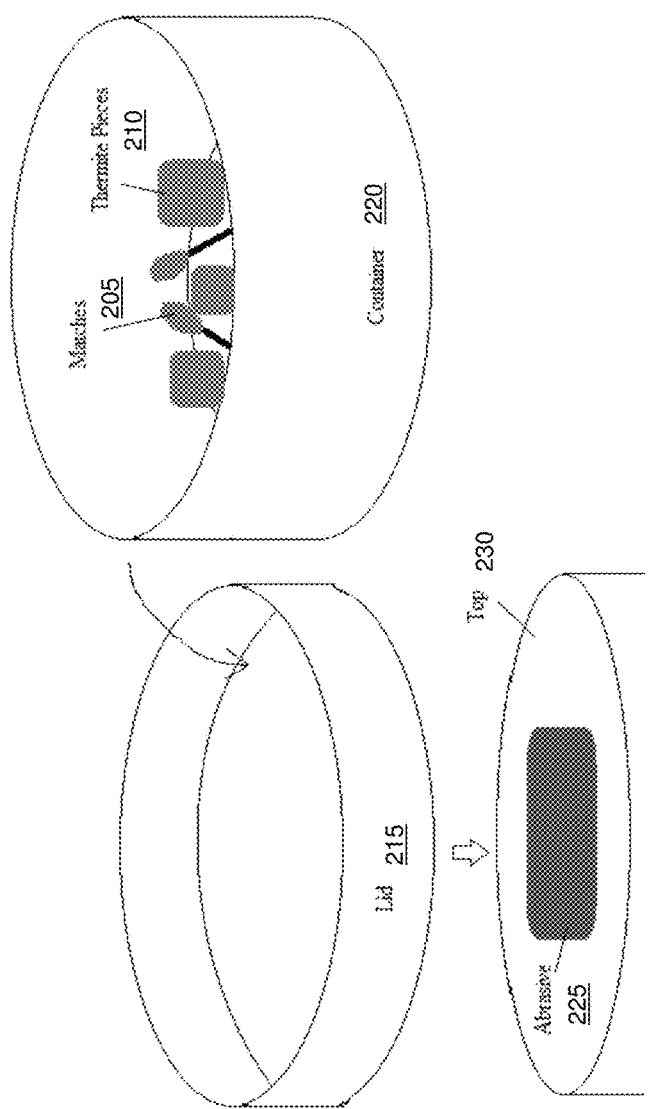
Figure 3:
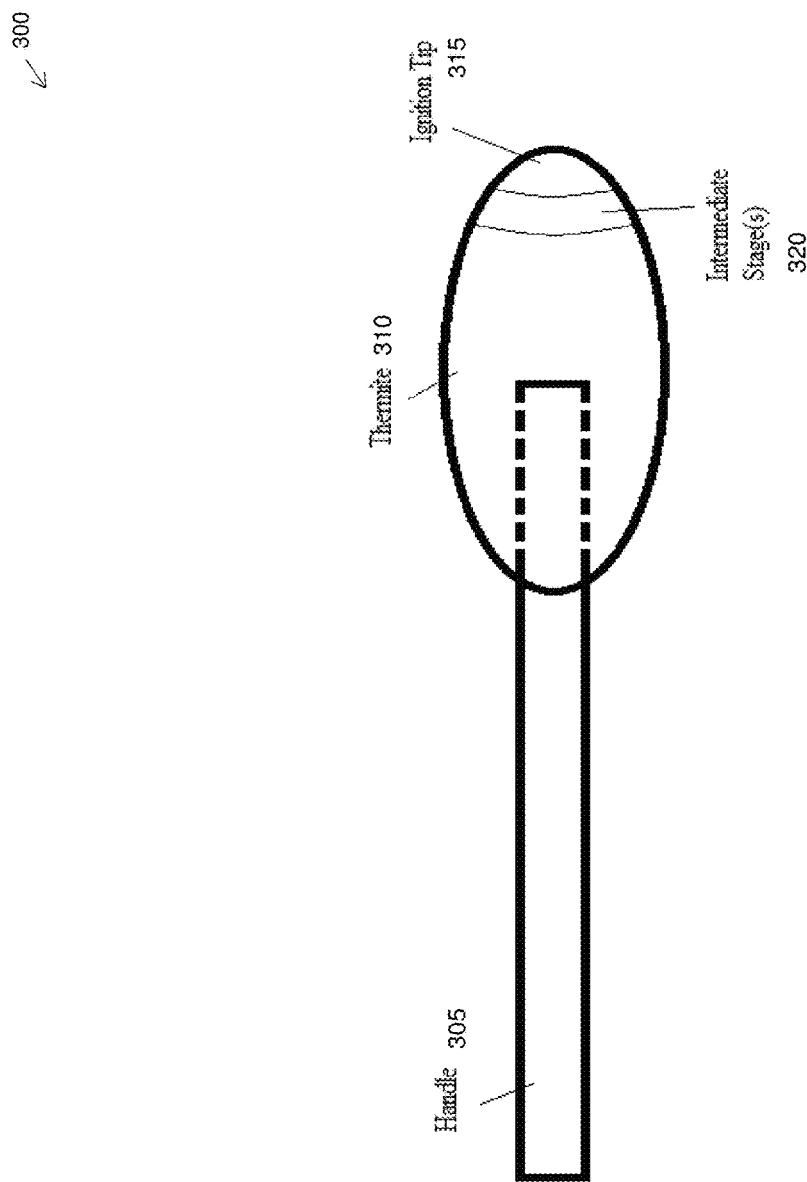
FIG. 3 illustrates an example of a thermite match in accordance with one or more embodiments of the present disclosure.

Specifically, according to the present disclosure, embodiments herein provide for a portable pieced thermite fire starter kit 100, as shown in FIG. 1. For instance, with reference to FIGS. 2A-4B below, in one embodiment of a kit 200, one or more small pieces 210 (e.g., formed cubed, short rods or rod segments, etc.) of thermite may be contained within a portable kit container 220 (e.g., fireproof) along with one or more ignition items. In one embodiment, the ignition items comprise thermite matches 205, though other ignition devices are conceived (e.g., plasma ignition, chemical compounds, intermediate ignition materials to be used with conventional lighters/matches, etc.). In one embodiment, the ignition items are kept separate from the pieces of thermite 210. For instance, in one embodiment, an abrasive 225 (e.g., red-phosphorous counter chemical) may be located on a bottom surface 230 of the container 220 (as shown in FIG. 2A), or may be located on the top surface 235 of the lid 215 (as shown in FIG. 2B).

In one embodiment, one or both of the thermite pieces and/or thermite matches are constructed as multiple layers of progressively ignitable materials and/or compounds, as shown below. In particular, the layers may start at a first layer (that is most easily ignited) and that can reach a first burn temperature that is at least a subsequent adjacent layer ignition temperature, where each subsequent intermediate layer leading to the thermite progressively increases in ignition temperature to not more than a previously adjacent layer burn temperature and also increases in burn temperature to at least a subsequent adjacent layer ignition temperature. For instance, the thermite match 300 (FIG. 3) may comprise a multi-staged formulation at the end of a handle 305 comprising at least an outer ignition tip 315 and a thermite fuel stage (thermite 310). The outer ignition tip may comprise an ignition compound (e.g., potassium chlorate) that can be struck/scraped against an abrasive counter-chemical surface (e.g., red phosphorous) to initiate the reaction, which in one embodiment is located on the outside of the portable kit container. In one embodiment, the thermite match 300 may also have one or more intermediate stages 320 to increase the burn temperature through increasing progressions of burn temperatures and ignition temperatures, accordingly. The high burn temperature of the thermite match may then be used to ignite the thermite pieces.

Figure 4A:
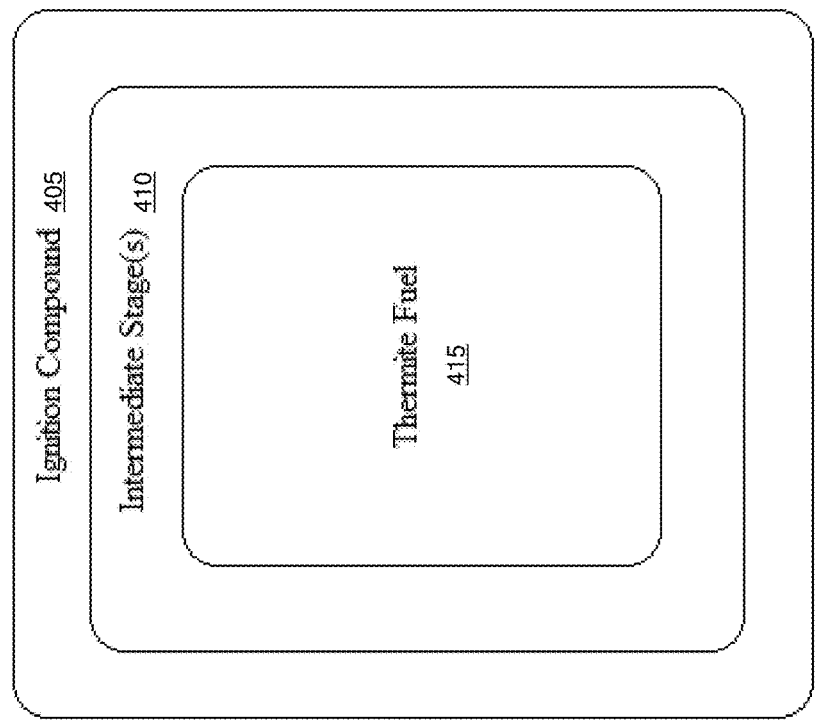
FIGS. 4A-4B illustrate examples of progressive ignitability in accordance with one or more embodiments of the present disclosure.
Figure 4B:
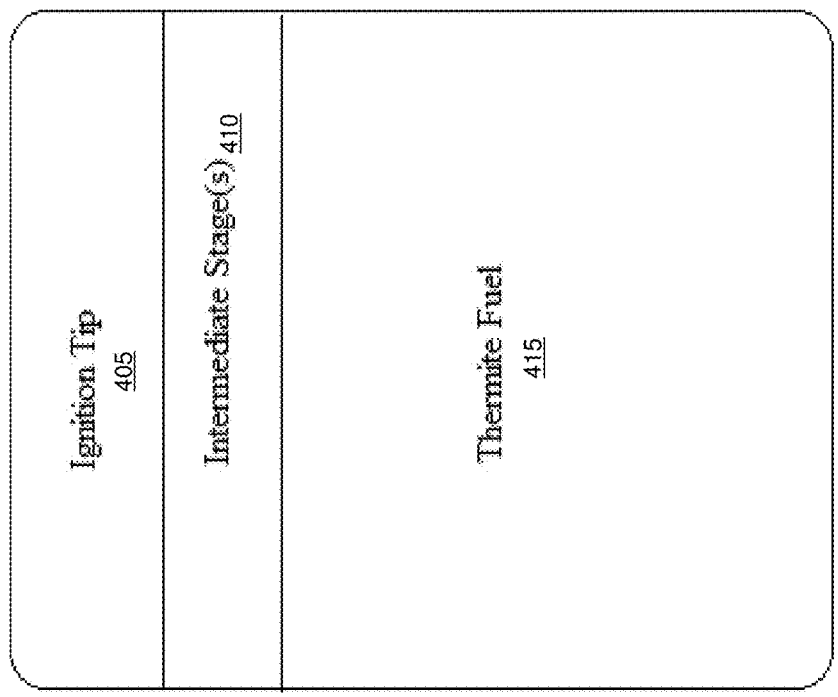

Alternatively, where the thermite pieces have multiple progressively ignitable layers (FIG. 4A or FIG. 4B), the kit may contain conventional matches suitable for igniting the first of such layers. The ignited thermite pieces may then be used to further ignite other hard-to-ignite materials, such as wet wood, larger fuel wood, and so on. For instance, as shown in FIG. 4A, a thermite piece 400a (shown in cutaway form) may comprise an outer ignition compound 405, one or more intermediate stages 410, and the thermite 415. In this manner, orientation of the thermite piece 400a does not matter for igniting. Alternatively, as shown in FIG. 4B, a thermite piece 400b may comprise a more "top-down" configuration, where there is an ignition tip compound 405, one or more intermediate layers 410, and the thermite 415, stacked in order, thus requiring proper orientation for igniting the piece.

Additionally, according to the present disclosure, embodiments herein also provide for a portable thermite block fire starter kit. For instance, with reference to kit 500 of FIG. 5, a block of thermite 510 may be contained within a portable kit container 520 (e.g., fireproof) and its lid 515, along with one or more ignition items 505. In one embodiment, the block of thermite 510 is the shape of size (in area) of the kit container 520, and in one embodiment may be formed directly into the kit container (e.g., a puck-shaped container). In one embodiment, the ignition items comprise thermite matches. In one embodiment, the ignition items are kept separate from the block of thermite 510 (e.g., a fireproof layer, or a simple separation layer).

Figure 5:
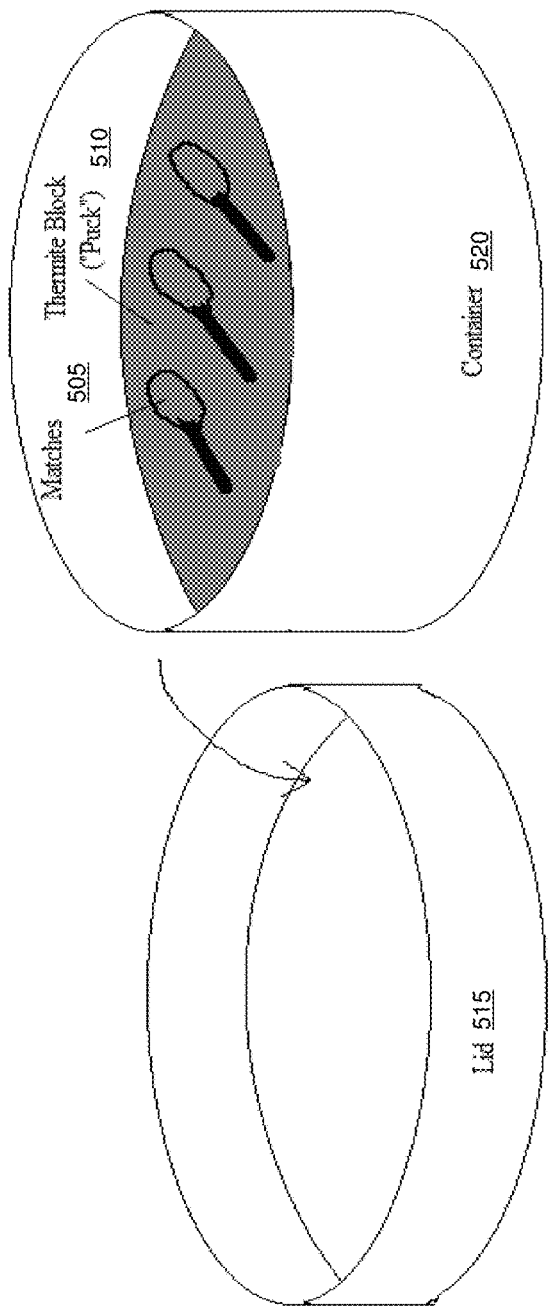
FIG. 5 illustrates an example of a portable thermite block fire starter kit in accordance with one or more embodiments of the present disclosure.
Figure 6:
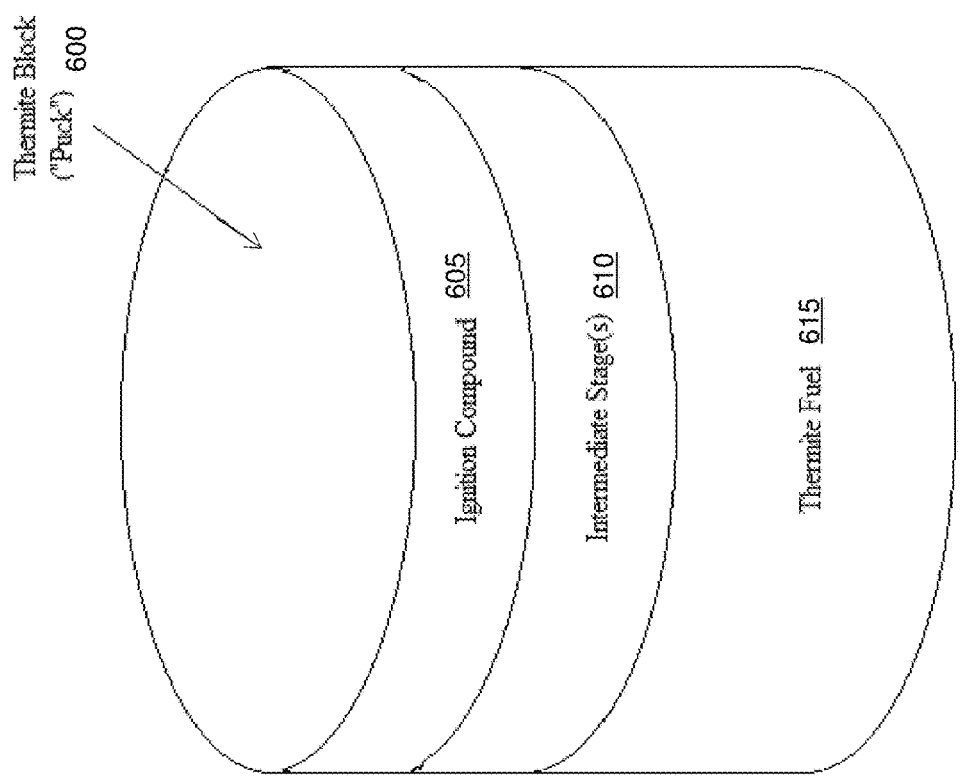
FIG. 6 illustrates another example of progressive ignitability in accordance with one or more embodiments of the present disclosure.

In one embodiment, one or both of the thermite block and/or thermite matches are constructed as multiple layers of progressively ignitable materials and/or compounds. For instance, as shown in FIG. 6, layers of a thermite block 600 (within a container as shown in FIG. 5) may start at a first layer 605 (an "ignition compound" that is most easily ignited) and that can reach a first burn temperature that is at least a subsequent adjacent "intermediate stage" layer 610 ignition temperature, where each subsequent intermediate layer leading to the thermite 615 progressively increases in ignition temperature to not more than a previously adjacent layer burn temperature and also increases in burn temperature to at least a subsequent adjacent layer ignition temperature.

For instance, similar to the embodiment above, a thermite match may comprise a multi-staged formulation comprising at least an outer ignition tip and a thermite fuel stage. The outer ignition tip may comprise an ignition compound (e.g., potassium chlorate) that can be struck/scraped against an abrasive counter-chemical surface (e.g., red phosphorous) to initiate the reaction, which in one embodiment is located on the outside of the portable kit container. The high burn temperature of the thermite match may then be used to ignite the thermite block. Alternatively, where the thermite block has multiple progressively ignitable layers (FIG. 6), the kit may contain conventional matches suitable for igniting the first of such layers. The ignited thermite block may then be used to further ignite other hard-to-ignite materials, such as wet wood, larger fuel wood, and so on.

Note that other materials, such as packaging, fire-assistant materials, combinations of the two (e.g., cotton, cloth, fibers, etc.) may also be included within the kits described above, and the examples shown, including shapes, sizes, quantity, etc., are not meant to be limiting to the scope of the present disclosure.

Also note that specific examples of layered ignition may be based on various combinations of Potassium Chlorate (KClO3), Magnesium (Mg), Copper Thermite (e.g., CuO·Al) and/or Iron Thermite (e.g., Fe2O3·Al), and any number of binders, fillers, and/or other materials.

One preferred formula of a three-layer progression (including an illustrative first layer that may be struck against an abrasive counter-chemical surface (e.g., red phosphorous) to ignite), may comprise the following (Tables 1-3B, as shown in FIGS. 7A-7D), such as for a thermite match or for the layers of the thermite fuel, prior to igniting the final thermite layer:

Other ranges, percentages, masses, ratios, and so on may be used, and those shown above are merely one example of multi-layered progression. Other materials and/or compounds may also be used, such as for replacements, additions, and so on (e.g., nitrocellulose), and certain materials and/or compounds shown above may be removed. Further, the use of a material in one layer does not exclude its use in other layers, such as adding polyvinyl alcohol (PVA) to later layers than merely the outer tip, and so on.

Advantageously, the techniques herein particularly provide a portable pieced thermite fire starter kit. In particular, the present disclosure provides for a convenient and safely contained system for portable and reliable fire starting, such as where other fuels are difficult to ignite (e.g., wet tinder/kindling and/or or large wood fuel).

As described above, an example portable thermite fire starter kit herein may comprise: a handheld fireproof container; a fireproof lid for the handheld fireproof container; a thermite material contained within the handheld fireproof container, the thermite material having a thermite ignition temperature and a thermite burn temperature; and one or more ignition items capable of being manually ignited by a user and igniting the thermite material.

In one embodiment, the thermite material comprises a plurality of individual pieces of thermite. In one embodiment, the plurality of individual pieces of thermite are selected from a group consisting of: formed thermite cubes; rod thermite segments; and balls of thermite. In one embodiment, the thermite material comprises a single block of thermite substantially sized to the handheld fireproof container. In one embodiment, the single block of thermite is formed within the handheld fireproof container. In one embodiment, the one or more ignition items comprise one or more matches. In one embodiment, the one or more matches comprise thermite matches. In one embodiment, the portable thermite fire starter kit further comprises: an abrasive counter-chemical surface to initiate an ignition reaction with an ignition tip of the one or more matches that has an ignition compound that can be struck against the abrasive counter-chemical surface to initiate an ignition reaction. In one embodiment, the one or more thermite matches comprise: a handle having a first end and a second end; a thermite match material affixed to the second end of the handle, the thermite match material having a thermite match ignition temperature and a thermite match burn temperature at least equal to the thermite ignition temperature of the thermite material contained within the handheld fireproof container; an intermediate transition material disposed at a distal end of the thermite match material away from the handle, the intermediate transition material having an intermediate ignition temperature and a burn temperature at least equal to the thermite match ignition temperature; and an outer ignition tip disposed at a distal end of the intermediate transition material away from the handle, the outer ignition tip having an ignition property that is more ignitable than both the intermediate transition material and the thermite match material, the outer ignition tip further having a burn temperature at least equal to the intermediate transition material, wherein ignition of the outer ignition tip causes ignition of the intermediate transition material which further causes ignition of the thermite match material. In one embodiment, the portable thermite fire starter kit further comprises: a separation barrier to separate the one or more ignition items from the thermite material. In one embodiment, the thermite material comprises a plurality of layers of progressively ignitable materials. In one embodiment, the plurality of layers of progressively ignitable materials comprise a) an intermediate transition material consisting of a low-density thermite, and b) a final thermite material consisting of a high-density thermite. In one embodiment, the plurality of layers of progressively ignitable materials comprise a) an intermediate transition material consisting of a magnesium-based thermite, and b) a final thermite material consisting of a copper thermite. In one embodiment, the handheld fireproof container is cylindrical having a diameter larger than a height. In one embodiment, the portable thermite fire starter kit further comprises: one or more fire-assistant components. In one embodiment, the one or more fire-assistant components are selected from a group consisting of: cotton; cloth; fibers; wood; paper; and gel fuel.

While the present disclosure has illustrated various embodiments and specific implementations, other configurations may be made within the scope of the invention. For instance, while certain materials may have been shown for each component, other suitable materials may be used. Furthermore, while certain shapes or designs of the components have been shown and described, functionally similar designs may also be utilized herein. Moreover, while components of the present disclosure may be described separately and in separate figures, certain components from each embodiment may be incorporated into each other embodiment, and the components shown in each of the illustrations are not meant to be mutually exclusive. That is, various combinations of components may be made with the scope of the present disclosure by combining the described components in useful manners.

In addition, it is well known in the art that by adjusting parameters such as blend ratios, density, particle size, and forming techniques, the composition of thermite may be modified in terms of burn rate and heat transfer intensity. For example, the exothermic reaction proceeds at a slower rate as composition density is increased. Heat transfer rate is slower where lesser thermally conductive compounds are used. While the invention is intended primarily for a relatively slow burn rate, it is envisioned that the invention may be used in faster burn rates (e.g., explosive applications).

It should also be noted that any steps shown and/or described in any procedure(s) or discussions above are merely examples for illustration, and certain other steps may be included or excluded as desired. Further, while a particular order of the steps may have been discussed and/or shown, this ordering is merely illustrative, and any suitable arrangement of the steps may be utilized without departing from the scope of the embodiments herein.

The foregoing description has been directed to specific embodiments. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A portable thermite fire starter kit, comprising:
   a handheld fireproof container;
   a fireproof lid for the handheld fireproof container;
   a thermite material contained within the handheld fireproof container, the thermite material having a thermite ignition temperature and a thermite burn temperature; and
   one or more thermite matches capable of being manually ignited by a user and igniting the thermite material wherein the thermite matches comprise:
   a handle having a first end and a second end;
   a thermite match material affixed to the second end of the handle, the thermite match material having a thermite match ignition temperature and a thermite match burn temperature at least equal to the thermite ignition temperature of the thermite material contained within the handheld fireproof container;
   an intermediate transition material disposed at a distal end of the thermite match material away from the handle, the intermediate transition material having an intermediate ignition temperature and a burn temperature at least equal to the thermite match ignition temperature; and
   an outer ignition tip disposed at a distal end of the intermediate transition material away from the handle, the outer ignition tip having an ignition property that is more ignitable than both the intermediate transition material and the thermite match material, the outer ignition tip further having a burn temperature at least equal to the intermediate transition material, wherein ignition of the outer ignition tip causes ignition of the intermediate transition material which further causes ignition of the thermite match material.

2. The portable thermite fire starter kit as in claim 1, wherein the thermite material comprises a plurality of individual pieces of thermite.

3. The portable thermite fire starter kit as in claim 2, wherein the plurality of individual pieces of thermite are selected from a group consisting of: formed thermite cubes; rod thermite segments; and balls of thermite.

4. The portable thermite fire starter kit as in claim 1, wherein the thermite material comprises a single block of thermite substantially sized to the handheld fireproof container.

5. The portable thermite fire starter kit as in claim 4, wherein the single block of thermite is formed within the handheld fireproof container.

6. The portable thermite fire starter kit as in claim 1, further comprising:
   an abrasive counter-chemical surface to initiate an ignition reaction with an ignition tip of the one or more matches that has an ignition compound that can be struck against the abrasive counter-chemical surface to initiate an ignition reaction.

7. The portable thermite fire starter kit as in claim 1, further comprising:
   a separation barrier to separate the one or more ignition items from the thermite material.

8. The portable thermite fire starter kit as in claim 1, wherein the thermite material comprises a plurality of layers of progressively ignitable materials.

9. The portable thermite fire starter kit as in claim 8, wherein the plurality of layers of progressively ignitable materials comprise a) an intermediate transition material consisting of a low-density thermite, and b) a final thermite material consisting of a high-density thermite.

10. The portable thermite fire starter kit as in claim 8, wherein the plurality of layers of progressively ignitable materials comprise a) an intermediate transition material consisting of a magnesium-based thermite, and b) a final thermite material consisting of a copper thermite.

11. The portable thermite fire starter kit as in claim 1, wherein the handheld fireproof container is cylindrical having a diameter larger than a height.

12. The portable thermite fire starter kit as in claim 1, further comprising:
   one or more fire-assistant components.

13. The portable thermite fire starter kit as in claim 12, wherein the one or more fire-assistant components are selected from a group consisting of: cotton; cloth; fibers; wood; paper; and gel fuel.

14. A portable thermite fire starter kit, comprising:
    a handheld, cylindrical fireproof container having a diameter larger than a height;
    a fireproof lid for the handheld fireproof container;
    a thermite material contained within the handheld fireproof container, the thermite material having a thermite ignition temperature and a thermite burn temperature; and
    one or more thermite matches capable of being manually ignited by a user and igniting the thermite material wherein the thermite matches comprise:
    a handle having a first end and a second end;
    a thermite match material affixed to the second end of the handle, the thermite match material having a thermite match ignition temperature and a thermite match burn temperature at least equal to the thermite ignition temperature of the thermite material contained within the handheld fireproof container;

an intermediate transition material disposed at a distal end of the thermite match material away from the handle, the intermediate transition material having an intermediate ignition temperature and a burn temperature at least equal to the thermite match ignition temperature; and an outer ignition tip disposed at a distal end of the intermediate transition material away from the handle, the outer ignition tip having an ignition property that is more ignitable than both the intermediate transition material and the thermite match material, the outer ignition tip further having a burn temperature at least equal to the intermediate transition material, wherein ignition of the outer ignition tip causes ignition of the intermediate transition material which further causes ignition of the thermite match material.

15. The portable thermite fire starter kit as in claim 14, further comprising:

one or more fire-assistant components.

16. The portable thermite fire starter kit as in claim 15, wherein the one or more fire-assistant components are selected from a group consisting of: cotton; cloth; fibers; wood; paper; and gel fuel.

* * * * *